(12) United States Patent
Gao et al.

(10) Patent No.: US 12,120,687 B2
(45) Date of Patent: Oct. 15, 2024

(54) TRANSMISSION METHOD FOR UCI PERFORMED BY TERMINAL

(71) Applicant: DATANG MOBILE COMMUNICATIONS EQUIPMENT CO., LTD., Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 489 days.

(21) Appl. No.: 17/431,174

(22) PCT Filed: Jan. 10, 2020

(86) PCT No.: PCT/CN2020/071546
§ 371 (c)(1),
(2) Date: Aug. 16, 2021

(87) PCT Pub. No.: WO2020/164347
PCT Pub. Date: Aug. 20, 2020

(65) Prior Publication Data
US 2022/0150939 A1 May 12, 2022

(30) Foreign Application Priority Data
Feb. 15, 2019 (CN) .......... 201910117831.X

(51) Int. Cl.
*H04W 72/21* (2023.01)
*H04W 72/1268* (2023.01)
*H04W 72/0446* (2023.01)

(52) U.S. Cl.
CPC ....... *H04W 72/21* (2023.01); *H04W 72/1268* (2013.01); *H04W 72/0446* (2013.01)

(58) Field of Classification Search
CPC ............. H04W 72/21; H04W 72/1268; H04W 72/0446; H04W 72/542; H04W 72/569;
(Continued)

(56) References Cited

U.S. PATENT DOCUMENTS

| 2018/0110047 A1 | 4/2018 | Babaei et al. |
| 2018/0167933 A1 | 6/2018 | Yin et al. |

(Continued)

FOREIGN PATENT DOCUMENTS

| CN | 107276715 A | 10/2017 |
| CN | 107734688 A | 2/2018 |

(Continued)

OTHER PUBLICATIONS

Panasonic,"Discussion on partial overlap between PUCCH and PUSCH", 3GPP TSG RAN WG1 Meeting #92, Athens, Greece, Feb. 26-Mar. 2, 2018, total 3 pages, R1-1802512.

(Continued)

*Primary Examiner* — Kiet Tang
(74) *Attorney, Agent, or Firm* — Kilpatrick Townsend & Stockton LLP

(57) ABSTRACT

Disclosed are a transmission method and device, for use in solving the problem in the prior art that no specific solution is available for dealing with how to transmit an SR and a PUSCH when the SR overlaps with the PUSCH in a time domain. If it is determined that a PUCCH bearing first type of DCI overlaps with the PUSCH in the time domain after a target node of the PUSCH, it is possible to select to discard the first type of DCI or delay the first type of DCI to the next transmission opportunity for transmitting.

20 Claims, 3 Drawing Sheets

(58) Field of Classification Search
CPC .... H04W 28/06; H04L 5/0078; H04L 5/0053; H04L 47/24; H04L 47/283; H04L 47/32
See application file for complete search history.

(56) References Cited

U.S. PATENT DOCUMENTS

| | | | |
|---|---|---|---|
| 2018/0359057 A1* | 12/2018 | Yang | H04L 1/1861 |
| 2019/0089510 A1* | 3/2019 | Gerstenberger | H04L 5/006 |
| 2020/0163080 A1* | 5/2020 | Takeda | H04L 5/0082 |

FOREIGN PATENT DOCUMENTS

| | | |
|---|---|---|
| CN | 108400806 A | 8/2018 |
| CN | 108811135 A | 11/2018 |
| WO | 2018129085 A1 | 7/2018 |
| WO | 2018143738 A1 | 8/2018 |

OTHER PUBLICATIONS

Qualcomm Incorporated,"Remaining issues for multiplexing UCI on PUSCH", 3GPP TSG RAN WG1 Meeting #92bis, Sanya, China, Apr. 16-20, 2018, total 8 pages, R1-1804804.
Qualcomm Incorporated,"Summary of remaining issues for UCI multiplexing on PUSCH", 3GPP TSG RAN WG1 Meeting #92bis, Sanya, China, Apr. 16-20, 2018, total 9 pages, R1-1805554.
Xiaomi,"Consideration on SR transmission occasion overlap with a UL-SCH resource", 3GPP TSG-RAN2 NR#101bis, Sanya, China, Apr. 16-Apr. 20, 2018, total 4 pages, R2-1804877.

* cited by examiner

TRANSMISSION METHOD FOR UCI PERFORMED BY TERMINAL

CROSS REFERENCE TO RELATED APPLICATIONS

The present application is a National Stage of International Application No. PCT/CN2020/071546, filed on Jan. 10, 2020, which claims priority to the Chinese Patent Application No. 201910117831.X, filed to the China National Intellectual Property Administration on Feb. 15, 2019, and entitled 'TRANSMISSION METHOD AND DEVICE', both of which are incorporated herein by reference.

FIELD

The present disclosure relates to the field of radio communication technology, in particular to a transmission method and device.

BACKGROUND

In the 5G new radio (NR) system, the same terminal may have multiple service types at the same time, such as enhanced mobile broadband (eMBB) and ultra-reliability and low latency communication (URLLC).

In NR R16, the priority of URLLC is higher than the priority of eMBB. If a scheduling request (SR) overlaps with a physical uplink shared channel (PUSCH) in a time domain, when the SR is an SR corresponding to URLLC, since the priority of URLLC is higher than the priority of eMBB, the SR may not be dropped, and one possible way is to drop the PUSCH overlapping with the SR. However, a physical layer will only prepare to transmit a positive SR on physical uplink control channel (PUCCH) resources corresponding to the SR only when receiving SR trigger notified by a medium access control (MAC) layer. Therefore, when the terminal determines that the SR overlaps with the PUSCH, it is possible that the PUSCH has already started to be transmitted. At the moment, if the PUSCH that has already started to be transmitted is dropped due to overlap with the SR, the part that has already been transmitted will be wasted.

In summary, no specific solution is available for dealing with how to transmit the SR and the PUSCH when the SR overlaps with the PUSCH in the time domain in NR R16.

SUMMARY

The present disclosure provides a transmission method and device, for solving the problem in the prior art that no specific solution is available for dealing with how to transmit an SR and a PUSCH in a condition that the SR overlaps with the PUSCH in a time domain.

In one embodiment of the present disclosure provides a transmission method, including:
  in response to determining that a PUCCH carrying a first type of uplink control information (UCI) overlaps with a PUSCH in a time domain after a target time node of the PUSCH,
  dropping the first type of UCI or delaying the first type of UCI to be transmitted in a next transmission occasion.

In the above method, in response to determining that the PUCCH carrying the first type of UCI overlaps with the PUSCH in the time domain after the target time node of the PUSCH, it is possible to select to drop the first type of UCI or delay the first type of UCI to be transmitted in the next transmission occasion. The first type of UCI borne by the PUCCH overlapping with the PUSCH is dropped or delayed to be transmitted in the next transmission occasion, thus ensuring that one PUSCH ready to be transmitted or being transmitted may be normally transmitted and reducing a waste of system resources.

In one possible implementation, the method includes:
  in response to determining that the PUCCH carrying the first type of UCI overlaps with the PUSCH in the time domain before the target time node of the PUSCH,
  dropping the PUSCH and transmitting the first type of UCI.

In the above method, in response to determining that the PUCCH carrying the first type of UCI overlaps with the PUSCH in the time domain before the target time node of the PUSCH, the PUSCH may be dropped and the first type of UCI may be transmitted. It is determined that the PUCCH carrying the first type of UCI overlaps with the PUSCH in the time domain before the target time node of the PUSCH, that is to say, when it is determined that the PUCCH carrying the first type of UCI overlaps with the PUSCH in the time domain, the PUSCH is not ready to be transmitted or is not transmitting, so that dropping the PUSCH may cause no resource waste, and the first type of UCI may be normally transmitted.

In one possible implementation, the target time node includes:
  a transmission start instant or symbol of the PUSCH, or
  an instant or symbol corresponding to a time duration T1 after a transmission start instant or symbol of the PUSCH, or
  a first symbol satisfying a time duration T1 after a transmission start instant or symbol of the PUSCH, or
  an instant or symbol corresponding to a time duration T2 before a transmission start instant or symbol of the PUSCH, or
  a first symbol satisfying a time duration T2 before a transmission start instant or symbol of the PUSCH.

The above method gives five conditions of the target time node. In response to determining that the PUCCH carrying the first type of UCI overlaps with the PUSCH in the time domain after the target time node determined in any one condition, the first type of UCI is dropped or delayed to be transmitted in the next transmission occasion, and only the PUSCH is transmitted in the transmission occasion, thus avoiding dropping one PUSCH that has already started to be prepared or started to be transmitted midway and reducing resource waste.

In one possible implementation, the time duration T1 or the time duration T2 is a predefined time length or a predefined symbol quantity, or the time duration T1 or the time duration T2 is a time length or a symbol quantity determined according to a predefined rule.

In the above method, the time duration T1 or the time duration T2 is a predefined time length or a predefined symbol quantity, or the time duration T1 or the time duration T2 is a time length or a symbol quantity determined according to a predefined rule.

In one possible implementation, the time duration T1 is 1/N of a transmission length of the PUSCH, and N is a positive integer greater than 1; and/or the time duration T2 is a preparation duration of the PUSCH.

In the above method, T1 and T2 are further defined. T1 may be N % of the transmission length of the PUSCH, so that it is stipulated that after the PUSCH has been transmitted by N %, the PUSCH is not allowed to be stopped midway, and if the PUSCH has been transmitted by less than N %, it is possible to select to transmit the first type of UCI and drop the PUSCH, that is, it is considered that a part of the PUSCH that has already been transmitted at the moment is relatively short, and the impact on system efficiency is acceptable. T2 may be the preparation duration of the PUSCH to determine to transmitting the first type of UCI or the PUSCH according to whether the PUSCH has been started to be prepared, that is, if the first type of UCI overlaps with the PUSCH before the PUSCH is started to be prepared, it is possible to select to transmit the first type of UCI and drop the PUSCH, that is, the PUSCH does not need to start to be prepared, and even if the PUSCH is dropped, a waste of power and processing resources caused by the fact that the PUSCH is prepared but not transmitted is not caused. If it is determined that the first type of UCI overlaps with the PUSCH after the PUSCH has been started to be prepared, even if it is determined that the first type of UCI overlaps with the PUSCH before the transmission start symbol of the PUSCH, in order to avoid a waste of power and processing resources consumed by preparing the PUSCH, it is possible to select to transmit the PUSCH and drop or delay the transmission of the first type of UCI at the moment. If T1 and T2 are 0, equivalently, the target time node is the transmission start symbol or transmission start instant of the PUSCH, that is, if it may be determined that the first type of UCI overlaps with the PUSCH before the transmission start symbol or transmission start instant of the PUSCH, it is possible to select to transmit the first type of UCI and drop the PUSCH, and the PUSCH is not transmitted from a first symbol even if the first type of UCI does not overlap with the PUSCH from the first symbol of the PUSCH. If it is determined that the first type of UCI overlaps with the PUSCH after the transmission start symbol or transmission start instant of the PUSCH, since the PUSCH has been started to be transmitted, in order to avoid a waste of power and processing resources occupied by the PUSCH that has been transmitted, it is possible to select to complete the transmission of the PUSCH and drop or delay the transmission of the first type of UCI.

In one possible implementation, delaying the first type of UCI to be transmitted in the next transmission occasion includes:

not transmitting the first type of UCI in a transmission occasion overlapping with the PUSCH; and transmitting the first type of UCI in an earliest transmission occasion after the transmission occasion overlapping with the PUSCH.

In the above method, when the first type of UCI is delayed to be transmitted in the next transmission occasion, the first type of UCI is not transmitted in the transmission occasion overlapping with the PUSCH but in the earliest transmission occasion after the transmission occasion overlapping with the PUSCH, thus avoiding excessive delay of the first type of UCI.

In one possible implementation, transmitting the first type of UCI in the earliest transmission occasion after the transmission occasion overlapping with the PUSCH includes:

dropping the PUSCH overlapping with the PUCCH carrying the first type of UCI in response to that the PUSCH overlaps with the PUCCH carrying the first type of UCI in the earliest transmission.

In the above method, when the first type of UCI is delayed to the earliest transmission occasion, and when another PUSCH overlaps with the PUCCH carrying the first type of UCI in the earliest transmission occasion, the PUSCH overlapping with the PUCCH carrying the first type of UCI in the earliest transmission occasion needs to be dropped in order to normally transmit the first type of UCI.

In one possible implementation, dropping the PUSCH overlapping with the PUCCH carrying the first type of UCI includes:

not preparing and transmitting the PUSCH overlapping with the PUCCH carrying the first type of UCI; or starting to not transmit the PUSCH overlapping with the PUCCH carrying the first type of UCI at a transmission start instant of the PUSCH overlapping with the PUCCH carrying the first type of UCI.

The above method gives two ways to drop the PUSCH overlapping with the PUCCH carrying the first type of UCI. First, the PUSCH overlapping with the PUCCH carrying the first type of UCI is neither prepared to be transmitted nor transmitted. Second, the PUSCH overlapping with the PUCCH carrying the first type of UCI is started to be not transmitted from the transmission start instant of the PUSCH overlapping with the PUCCH carrying the first type of UCI, so the first type of UCI delayed to the next transmission occasion may be normally transmitted.

In one possible implementation, the first type of UCI is one of the following information: an SR, UCI corresponding to a first type of service, or an SR corresponding to the first type of service; and/or, the PUSCH is a PUSCH corresponding to the first type of service or a second type of service.

The above method defines the first type of UCI and the PUSCH: the first type of UCI may be the SR, or the UCI corresponding to the first type of service, or the SR corresponding to the first type of service; and the PUSCH may be a PUSCH corresponding to the first type of service or a PUSCH corresponding to the second type of service.

In one possible implementation, the first type of service includes:

a service with a high priority or importance, or, a URLLC service; and the second type of service includes: a service with a low priority or importance, or an eMBB service, or, a non-URLLC service.

The above method further defines the first type of service and the second type of service: the first type of service may be the service with the high priority or importance, or the URLLC service; the second type of service may be the service with the low priority or importance, or the eMBB service, or the non-URLLC service. The priority or importance of the first type of service is higher than the priority or importance of the second type of service, so that the priorities or importance of the first type of UCI and the PUSCH overlapping with the PUCCH carrying the first type of UCI may be determined. That is, when the priority or importance of the first type of UCI is higher than or equal to the priority or importance of the PUSCH, the processing is performed in the above manner, and the first type of UCI is dropped or delayed to be transmitted in the next transmission occasion, that is, on the basis of comprehensive consideration of the priorities or importance, and whether there is a waste of preparation and processing resources, a transmission decision is made. Otherwise, if the priority or importance of the first type of UCI is lower than the priority or importance of the PUSCH, when overlap exists, the first type of UCI may always be dropped, and the transmission of the PUSCH is guaranteed.

In one possible implementation, priorities or importance or service types are determined according to at least one of the following corresponding information:
   downlink control information (DCI) formats;
   DCI sizes;
   radio network temporary identities (RNTIs);
   search spaces;
   control resource sets (CORESETs);
   beams;
   block error ratios (BLERs);
   channel quality indicator (CQI) tables;
   modulation and coding scheme (MCS) tables;
   priority flags;
   PUCCH resources; or
   SR configuration serial numbers.

The above method provides ways to determine the priorities or importance or service types, correspondingly including at least one of the DCI formats; the DCI sizes; the RNTIs; the search spaces; the CORESETs; the beams; the BLERs; the CQI tables; the MCS tables; the priority flags; the PUCCH resources; or the SR configuration serial numbers.

In another embodiment of the present disclosure provides a transmission device, including a processor, a memory and a transceiver.

The processor is used to read a program in the memory to:
   in response to determining that a PUCCH carrying a first type of UCI overlaps with a PUSCH in a time domain after a target time node of the PUSCH,
   drop the first type of UCI or delaying the first type of UCI to be transmitted in a next transmission occasion.

In one possible implementation, the processor is further configured to:
   in response to determining that the PUCCH carrying the first type of UCI overlaps with the PUSCH in the time domain before the target time node of the PUSCH,
   drop the PUSCH and transmit the first type of UCI.

In one possible implementation, the target time node includes
   a transmission start instant or symbol of the PUSCH, or
   an instant or symbol corresponding to a time duration T1 after a transmission start instant or symbol of the PUSCH, or
   a first symbol satisfying a time duration T1 after a transmission start instant or symbol of the PUSCH, or
   an instant or symbol corresponding to a time duration T2 before a transmission start instant or symbol of the PUSCH, or
   a first symbol satisfying a time duration T2 before a transmission start instant or symbol of the PUSCH.

In one possible implementation, the time duration T1 or the time duration T2 is a predefined time length or a predefined symbol quantity, or the time duration T1 or the time duration T2 is a time length or a symbol quantity determined according to a predefined rule.

In one possible implementation, the time duration T1 is 1/N of a transmission length of the PUSCH, and N is a positive integer greater than 1; and/or the time duration T2 is a preparation duration of the PUSCH.

In one possible implementation, when the first type of UCI is delayed to be transmitted in the next transmission occasion, the processor is further configured to:
   not transmit the first type of UCI in a transmission occasion overlapping with the PUSCH; and
   transmit the first type of UCI in an earliest transmission occasion after the transmission occasion overlapping with the PUSCH.

In one possible implementation, when the first type of UCI is transmitted in the earliest transmission occasion after the transmission occasion overlapping with the PUSCH, the processor is further configured to:
   drop the PUSCH overlapping with the PUCCH carrying the first type of UCI in response to that the PUSCH overlaps with the PUCCH carrying the first type of UCI in the earliest transmission occasion.

In one possible implementation, in the condition that the PUSCH overlapping with the PUCCH carrying the first type of UCI is dropped, the processor is further configured to:
   not prepare and transmit the PUSCH overlapping with the PUCCH carrying the first type of UCI; or
   start to not transmit the PUSCH overlapping with the PUCCH carrying the first type of UCI at a transmission start instant of the PUSCH overlapping with the PUCCH carrying the first type of UCI.

In one possible implementation, the first type of UCI is one of following information: an SR, UCI corresponding to a first type of service, or an SR corresponding to the first type of service; and/or,
   the PUSCH is a PUSCH corresponding to the first type of service or a second type of service.

In one possible implementation, the first type of service includes:
   a service with a high priority or importance, or, a URLLC service; and
   the second type of service includes: a service with a low priority or importance, or, an eMBB service, or, a non-URLLC service.

In one possible implementation, the priorities or importance or service types are determined according to at least one of following corresponding information: DCI formats; DCI sizes; RNTIs; search spaces; CORESETs; beams; BLERs; CQI tables; MCS tables; priority flags; PUCCH resources; or SR configuration serial numbers.

In one embodiment of the present disclosure provides another transmission device, including a determining device and a processing device.

In response to that the determining device, used to determines that a PUCCH carrying a first type of UCI overlaps with a PUSCH in a time domain after a target time node of the PUSCH, the processing device is configured to drop the first type of UCI or delay the first type of UCI to be transmitted in a next transmission occasion.

In one possible implementation, in response to that the determining device is determines that the PUCCH carrying the first type of UCI overlaps with the PUSCH in the time domain before the target time node of the PUSCH,
   the processing device is further configured to:
   drop the PUSCH and transmit the first type of UCI.

In one possible implementation, the determining device is further configured to determine the target time node in following manners:
   a transmission start instant or symbol of the PUSCH, or
   an instant or symbol corresponding to a time duration T1 after a transmission start instant or symbol of the PUSCH, or
   a first symbol satisfying a time duration T1 after a transmission start instant or symbol of the PUSCH, or
   an instant or symbol corresponding to a time duration T2 before a transmission start instant or symbol of the PUSCH, or
   a first symbol satisfying a time duration T2 before a transmission start instant or symbol of the PUSCH.

In one possible implementation, the time duration T1 or the time duration T2 is a predefined time length or a predefined symbol quantity, or the time duration T1 or the time duration T2 is a time length or a symbol quantity determined according to a predefined rule.

In one possible implementation, the time duration T1 is 1/N of a transmission length of the PUSCH, and N is a positive integer greater than 1; and/or the time duration T2 is a preparation duration of the PUSCH.

In one possible implementation, when the first type of UCI is delayed to be transmitted in the next transmission occasion, the processing device is further configured to:
not transmit the first type of UCI in a transmission occasion overlapping with the PUSCH; and
transmit the first type of UCI in an earliest transmission occasion after the transmission occasion overlapping with the PUSCH.

In one possible implementation, when the first type of UCI is transmitted in the earliest transmission occasion after the transmission occasion overlapping with the PUSCH, the processing device is further configured to:
drop the PUSCH overlapping with the PUCCH carrying the first type of UCI in response to that the PUSCH overlaps with the PUCCH carrying the first type of UCI in the earliest transmission occasion.

In one possible implementation, in the condition that the PUSCH overlapping with the PUCCH carrying the first type of UCI is dropped, the processing device is further configured to:
not prepare and transmit the PUSCH overlapping with the PUCCH carrying the first type of UCI; or
start to not transmit the PUSCH overlapping with the PUCCH carrying the first type of UCI at a transmission start instant of the PUSCH overlapping with the PUCCH carrying the first type of UCI.

In one possible implementation, the first type of UCI is one of following information: an SR, UCI corresponding to a first type of service, or an SR corresponding to the first type of service; and/or,
the PUSCH is a PUSCH corresponding to the first type of service or a second type of service.

In one possible implementation, the first type of service includes:
a service with a high priority or importance, or, a URLLC service; and
the second type of service includes: a service with a low priority or importance, or, an eMBB service, or, a non-URLLC service.

In one possible implementation, the priorities or importance or service types are determined according to at least one of following corresponding information: DCI formats; DCI sizes; RNTIs; search spaces; CORESETs; beams; BLERs; CQI tables; MCS tables; priority flags; PUCCH resources; or SR configuration serial numbers.

In one embodiment of the present disclosure further provides a computer storable medium on which a computer program is stored. When the program is executed by a processor, the steps of any one of the methods in the embodiments are implemented.

In addition, the effects brought about by any one of the implementations of the embodiments may be referred to the effects brought about by the different implementations of the embodiments, which will not be repeated herein.

BRIEF DESCRIPTION OF THE DRAWINGS

In order to illustrate the embodiments of the present disclosure, the drawings used in the description of the embodiments are briefly described below.

DETAILED DESCRIPTION OF THE EMBODIMENTS (1) In the embodiments of the present application, the terms "network" and "system" are often used interchangeably.

(2) The term "plurality" in the embodiments of the present application refers to two or more, and other quantifiers are similar to this.

(3) "And/or" describes the association relationship of associated objects, indicating that there may be three types of relationships, for example, A and/or B, which may mean: A alone exists, A and B exist at the same time, and B exists alone. The character "/" generally indicates that the associated objects before and after the character "/" are in an "or" relationship.

An SR is borne on a PUCCH to be transmitted, and is transmitted on a configured PUCCH resource according to a configured period.

In NR R15, when a MAC layer determines that the SR needs to be transmitted before establishing data, i.e. a protocol data unit (PDU), transmitted on the PUSCH, the MAC layer transmits the SR together with data in the PUSCH in a mode of a buffer status report (BSR), then no positive SR occurs in a physical layer, so PUCCH transmission is not performed on the PUCCH resources corresponding to the SR. If the MAC layer determines that the SR exists when the PDU has been started to be established or has been established, the SR may not be packed into the PDU in the mode of the BSR, at the moment, if the MAC layer determines that resources of the SR overlap with PUSCH resources carrying the PDU, positive SR transmission is not triggered to the physical layer, and therefore PUCCH transmission is not performed on the PUCCH resources corresponding to the SR. Thus, for a PUSCH (i.e., a PUSCH with a UL-SCH) carrying data, no overlap of the PUCCH carrying the SR with the PUSCH occurs in the physical layer.

Figure 1:
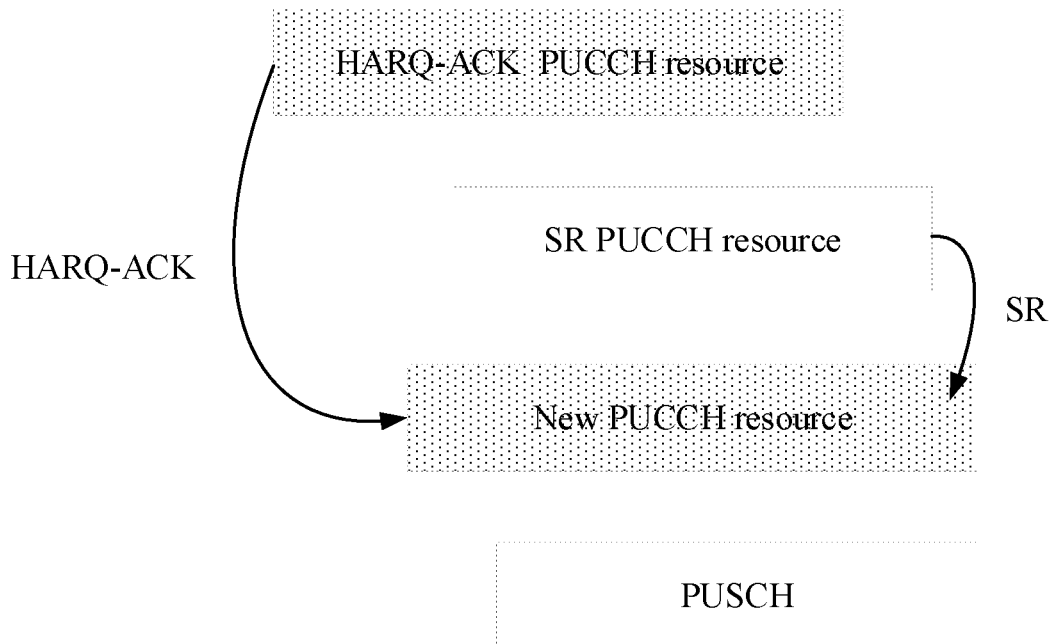
FIG. 1 is a schematic diagram of transmission in a condition that a PUCCH carrying a positive SR overlaps with a PUCCH carrying other UCI in the prior art.

In a condition that the MAC layer determines that SR transmission exists and the PUCCH resources carrying the SR do not overlap with the PUSCH, the MAC layer may trigger the physical layer to transmit the positive SR. If the PUCCH carrying the positive SR overlaps with a PUCCH carrying other UCI, such as a PUCCH carrying HARQ-ACK/CSI, the SR may be transferred to other PUCCH resources to be transmitted according to UCI multiplexing transmission rules, as shown in FIG. 1. The PUCCH may overlap with the PUSCH, indirectly causing the SR to overlap with the PUSCH, and it is currently specified that the SR is dropped since the SR cannot already be packed into the data borne by the PUSCH as the BSR.

In a condition that the PUSCH does not carry the UL-SCH, i.e., there is no packing procedure for the MAC PDU, the SR cannot be transmitted on the PUSCH in the form of the BSR. Since the PUSCH at the moment is used to carry SP-CSI or A-CSI, considering that the importance of CSI is not as high as the importance of the SR, it is specified at the moment that the PUSCH without UL-SCH is dropped and the SR is transmitted.

In NR R16, considering that the priority of the URLLC is higher than the priority of the eMBB, if the PUCCH carrying the SR overlaps with the PUSCH in a time domain, when the SR is an SR corresponding to the URLLC, the SR cannot be dropped because the priority of the URLLC is higher than the priority of the eMBB. If the PUSCH is ready to be transmitted or is being transmitted before the SR is transmitted on the PUCCH corresponding to the SR, dropping the PUSCH may cause a waste of resources, so in order to reduce a waste of resources, in a condition that the PUCCH carrying the SR overlaps with the PUSCH in the time domain, the SR may be dropped if possible, and the SR may be delayed to be transmitted in the next transmission occasion if the SR is not allowed to be dropped.

The application scenarios described by the embodiments of the present application are to more clearly illustrate the embodiments of the present application, and do not constitute a definition of the embodiments of the present application.

Aiming at the scenarios, the present application provides a transmission method, including the following steps:
    step 200, in response to determining that a PUCCH carrying a first type of UCI overlaps with a PUSCH in a time domain after a target time node of the PUSCH,
    step 201, the first type of UCI is dropped or delayed to be transmitted in the next transmission occasion.

In the embodiment of the present disclosure, in response to determining that the PUCCH carrying the first type of UCI overlaps with the PUSCH in the time domain after the target time node of the PUSCH, the first type of UCI is dropped or delayed to be transmitted in the next transmission occasion. The first type of UCI is dropped or delayed to be transmitted in the next transmission occasion, thus ensuring that the PUSCH is normally transmitted, avoiding dropping one PUSCH that has been started to be prepared or started to be transmitted midway and reducing a waste of system resources.

The transmission occasion is a transmission position each time of pre-configured or scheduled first type of UCI, for example, transmission occasions may be predetermined according to a configured period and offset value, for example, the period of the first type of UCI is 1 time slot, the specific transmission position is $13^{th}$ and $14^{th}$ symbols in each time slot, and then the $13^{th}$ and $13^{th}$ symbols in each time slot may be determined to form one transmission occasion. As another example, the transmission occasion is scheduled, e.g., the DCI schedules one downlink transmission each time, one particular time slot and a particular symbol in the this one time slot may be indicated by the DCI as the transmission position of HARQ-ACK for the downlink transmission scheduled by the DCI, the transmission position constitutes one transmission occasion, and such transmission occasion is not periodic and depends on the scheduling of the DCI.

The target time node in the embodiment of the present disclosure may have the following five types:
    a transmission start instant or symbol of the PUSCH, or
    an instant or symbol corresponding to a time duration T1 after a transmission start instant or symbol of the PUSCH, or
    a first symbol satisfying a time duration T1 after a transmission start instant or symbol of the PUSCH, or
    an instant or symbol corresponding to a time duration T2 before a transmission start instant or symbol of the PUSCH, or
    a first symbol satisfying a time duration T2 before a transmission start instant or symbol of the PUSCH.

That is, the first type of UCI is dropped or delayed to be transmitted in the next transmission occasion in the following five cases.

Case 1, after the transmission start instant or symbol of the PUSCH, it is determined that the PUCCH carrying the first type of UCI overlaps with the PUSCH in the time domain.

Case 2, after the instant or symbol corresponding to the time duration T1 after the transmission start instant or symbol of the PUSCH, it is determined that the PUCCH carrying the first type of UCI overlaps with the PUSCH in the time domain.

Case 3, after the first symbol satisfying the time duration T1 after the transmission start instant or symbol of the PUSCH, it is determined that the PUCCH carrying the first type of UCI overlaps with the PUSCH in the time domain.

Case 4, after the instant or symbol corresponding to a time duration T2 before the transmission start instant or symbol of the PUSCH, it is determined that the PUCCH carrying the first type of UCI overlaps with the PUSCH in the time domain.

Case 5, after the first symbol satisfying the time duration T2 before the transmission start instant or symbol of the PUSCH, it is determined that the PUCCH carrying the first type of UCI overlaps with the PUSCH in the time domain.

In the above case 1, the target time node is the transmission start symbol or transmission start instant of the PUSCH, that is, if it may be determined that the first type of UCI overlaps with the PUSCH before the transmission start symbol or the start instant of the PUSCH, it is possible to select to transmit the first type of UCI and drop the PUSCH, and the PUSCH is not transmitted from a first symbol even if the first type of UCI does not overlap with the PUSCH at the first symbol of the PUSCH. If it is determined that the first type of UCI overlaps with the PUSCH after the transmission start symbol or transmission start instant of the PUSCH, since the PUSCH has been started to be transmitted, in order to avoid a waste of power and processing resources occupied by the PUSCH which has been transmitted, it is possible to select to complete the transmission of the PUSCH, and drop or delay the transmission of the first type of UCI.

In the above cases 2 and 3, the target time node is the time duration T1 after the PUSCH is started to be transmitted, so it is agreed that the PUSCH may not be allowed to be stopped midway after the PUSCH has been transmitted for a length. If the PUSCH has been transmitted for less than a length, it is possible to select to transmit the first type of UCI and drop the PUSCH, that is, it is considered that the part of the PUSCH that has already be transmitted is relatively short at the moment, and the impact on system efficiency is acceptable. That is, transmitting the first type of UCI or the PUSCH is determined according to whether the PUSCH has been transmitted for the time duration T1. That is, if the first type of UCI overlaps with the PUSCH before an instant at which the PUSCH has not been transmitted for the time duration T1, it is possible to select to transmit the first type of UCI and drop the PUSCH, that is, if the PUSCH has been transmitted for less than the time duration T1, even if the PUSCH is dropped, the resource consumption occupied by the transmission for the time duration T1 is acceptable. If it is determined that the first type of UCI overlaps with the PUSCH after the PUSCH has been transmitted for the time duration T1, at the moment, if the PUSCH is dropped, the previous transmission for the time duration T1 is wasted. In order to avoid a waste of the power and processing resources consumed by transmission of this part of the PUSCH, it is possible to select to complete the PUSCH transmission, and drop or delay the transmission of the first type of UCI at the moment.

In the above cases 4 and 5, the target time node is the time duration T2 before the PUSCH is started to be transmitted, and an instant corresponding to the time duration T2 before the transmission start instant of the PUSCH is the latest time duration for the PUSCH to be started transmission preparation, that is, a series of operations such as encoding, scrambling, adjustment, pre-transformation and mapping need to be performed on information borne by the PUSCH from the time duration T2, thus ensuring that data preparation may be completed at the transmission start instant of the PUSCH and the PUSCH may be normally transmitted. That is, transmitting the first type of UCI or the PUSCH is determined according to whether the PUSCH has been started to be prepared, that is, if the first type of UCI overlaps with the PUSCH before the PUSCH is started to be prepared, it is possible to select to transmit the first type of UCI and drop the PUSCH, that is, the PUSCH does not need to be started to be prepared, and even if the PUSCH is dropped, a waste of power and processing resources caused by the fact that the PUSCH is prepared but not transmitted may not occur. If it is determined that the first type of UCI overlaps with the PUSCH after the PUSCH has been already started to be prepared, at the moment, even if it is determined that the first type of UCI overlaps with the PUSCH before the start symbol of the PUSCH, in order to avoid a waste of power and processing resources consumed for PUSCH preparation, it is possible to select to transmit the PUSCH and drop or delay the transmission of the first type of UCI.

In the embodiment, T1 or T2 is a predefined time length or a predefined symbol quantity; or T1 or T2 is a time length or a symbol quantity determined according to a predefined rule.

In one embodiment, T1 may be N % of a transmission length of the PUSCH, and N is a positive integer greater than 1; thus it is agreed that when the PUSCH has been transmitted by N %, the PUSCH is not allowed to be stopped midway, and if the PUSCH has been transmitted by less than N %, it is possible to select to transmit the first type of UCI and drop the PUSCH, that is, it is considered that the part of the PUSCH that has been already started to be transmitted is relatively short at the moment, and the impact on the system efficiency is acceptable.

In one embodiment, T2 may be a preparation time of the PUSCH. Therefore, transmitting the first type of UCI or the PUSCH may be determined according to whether the PUSCH has been started to be prepared, that is, if the first type of UCI overlaps with the PUSCH before the PUSCH is started to be prepared, it is possible to select to transmit the first type of UCI and drop the PUSCH, that is, the PUSCH does not need to be started to be prepared, and even if the PUSCH is dropped, a waste of power and processing resources caused by the fact that the PUSCH is prepared but not transmitted may not occur. If it is determined that the first type of UCI overlaps with the PUSCH after the PUSCH has been already started to be prepared, at the moment, even if it is determined that the first type of UCI overlaps with the PUSCH before the start symbol of the PUSCH, in order to avoid a waste of power and processing resources consumed for PUSCH preparation, it is possible to select to transmit the PUSCH and drop or delay the transmission of the first type of UCI.

If T1 and T2 are 0, equivalently, the target time node is the transmission start symbol or start instant of the PUSCH.

In the embodiment of the present disclosure, when the first type of UCI is delayed to be transmitted in the next transmission occasion, the first type of UCI is not transmitted in the transmission occasion overlapping with the PUSCH but is transmitted in the earliest transmission occasion after the transmission occasion overlapping with the PUSCH.

For example, the PUCCH carrying the first type of UCI in a current transmission occasion overlaps with the PUSCH in the time domain, at the moment, only the PUSCH is transmitted in the current transmission occasion, while the first type of UCI is not transmitted, and the first type of UCI is transmitted in the earliest transmission occasion after the current transmission occasion.

In implementation, when the first type of UCI is transmitted in the earliest transmission occasion after the transmission occasion overlapping with the PUSCH, if the PUSCH does not overlap with the PUCCH carrying the first type of UCI in the time domain in the earliest transmission occasion, the first type of UCI is normally transmitted in the earliest transmission occasion; and if the PUSCH overlaps with the PUCCH carrying the first type of UCI in the time domain in the earliest transmission occasion, the PUSCH overlapping with the PUCCH carrying the first type of UCI is dropped, and the first type of UCI is normally transmitted. This is because that the first type of UCI needs to be transmitted has been determined in the previous transmission occasion, and that the first type of UCI needs to be delayed to be transmitted in the earliest transmission occasion has also been determined in the previous transmission occasion. Therefore, if the PUSCH overlaps with the first type of UCI in the transmission occasion currently, it may be determined that the first type of UCI overlaps with the PUSCH before the PUSCH is started to be prepared or is started to be transmitted. Therefore, it may be determined that only the first type of UCI is transmitted and the PUSCH overlapping with the first type of UCI is dropped, thus avoiding a waste of resources for preparing or transmitting the PUSCH.

Dropping the PUSCH overlapping with the PUCCH carrying the first type of UCI in the earliest transmission occasion may be not preparing to transmit or not transmitting the PUSCH overlapping with the PUCCH carrying the first type of UCI; or not transmitting the PUSCH overlapping with the PUCCH carrying the first type of UCI from the transmission start instant of the PUSCH overlapping with the PUCCH carrying the first type of UCI, thus saving resources.

The first type of UCI may be an SR, or a UCI corresponding to a first type of service, or an SR corresponding to the first type of service.

The PUSCH may be a PUSCH corresponding to the first type of service or a second type of service.

The first type of service and the second type of service are described below, respectively.

The first type of service may be a service with the high priority or importance, or a URLLC service. The second type of service may be a service with the low priority or importance, or an eMBB service, or a non-URLLC service.

The corresponding service types and the priorities or importance of the first type of service and the second type of service may be determined according to one of the following information: DCI formats; DCI sizes; RNTIs; search spaces; CORESETs; beams; BLERs; CQI tables; MCS tables; priority flags; PUCCH resources; or SR configuration serial numbers.

For example, the first type of service is transmission corresponding to at least one of the first type of DCI format, the first type of DCI size, the first type of RNTI, the first type of search space, the first type of CORESET, the first type of beam, the first type of BLER, the first type of CQI table, the first type of MCS table, the first type of priority flag, the first type of PUCCH resource, or the first type of SR configuration serial number. Then, whether the first type of UCI or the PUSCH correspond to the first type of service may be determined according to whether the first type of UCI or the PUSCH correspond to at least one of the foregoing information, that is, the priorities and importance of the first type of UCI and the PUSCH may be determined.

The second type of service is transmission corresponding to at least one of the second type of DCI format, the second type of DCI size, the second type of RNTI, the second type of search space, the second type of CORESET, the second type of beam, the second type of BLER, the second type of CQI table, the second type of MCS table, the second type of priority flag, the second type of PUCCH resource, or the second type of SR configuration serial number. Then, whether the first type of UCI or the PUSCH correspond to the second type of service may be determined according to whether the first type of UCI or the PUSCH correspond to at least one of the foregoing information, that is, the priorities and importance of the first type of UCI and the PUSCH may be determined.

When it is predefined that the priority or importance of the transmission corresponding to at least one of the first type of DCI format, the first type of DCI size, the first type of RNTI, the first type of search space, the first type of CORESET, the first type of beam, the first type of BLER (such as 10-5 or 10-6), the first type of CQI table, the first type of MCS table, the first type of priority flag, the first type of PUCCH resource, or the first type of SR configuration serial number is higher than the priority or importance of the transmission corresponding to at least one of the second type of DCI format, the second type of DCI size, the second type of RNTI, the second type of search space, the second type of CORESET, the second type of beam, the second type of BLER, the second type of CQI table, the second type of MCS table, the second type of priority flag, the second type of PUCCH resource, or the second type of SR configuration serial number, the priorities and importance of the first type of UCI and the PUSCH may be compared according to whether the first type of UCI or the PUSCH correspond to at least one of the foregoing information.

It should be noted here that the first type of BLER may be 10-5 BLER or 10-6 BLER;
  the first type of CQI table may be a URLLC CQI table;
  the first type of MAC table may be a URLLC MAC table;
  the first type of PUCCH resource may be a resource with a small serial number, or a resource with a specific serial number, or a resource corresponding to a specific SR configuration serial number;
  the first type of SR configuration serial number may be that when multiple SR configurations are configured, an SR configuration with a lower serial number is considered to correspond to the URLLC;
  the second type of BLER may be 10-2 BLER or 10-1 BLER;
  the second type of CQI table may be a 64QAM/256QAM CQI table;
  the second type of PUCCH resource may be a resource with a large serial number, or a resource with a specific serial number, or a resource corresponding to a specific SR configuration serial number; or
  the second type of SR configuration serial number may be that when the multiple SR configurations are configured, an SR configuration with a larger serial number is considered to correspond to the eMBB or non-URLLC.

In the embodiment of the present disclosure, the priority or importance of the first type of service is higher than the priority or importance of the second type of service.

In the condition that it is determined that the PUCCH carrying the first type of UCI overlaps with the PUSCH in the time domain after the target time node of the PUSCH, the priority or importance of the first type of UCI and the priority or importance of the PUSCH are determined based on the above-mentioned method of determining the priority or importance. If the priority or importance of the first type of UCI is lower than the priority or importance of the PUCCH, the first type of UCI is always dropped and the transmission of the PUSCH is guaranteed. If the priority or importance of the first type of UCI is not lower than the priority or importance of the PUCCH, then the processing is performed according to the above method, and the first type of UCI is dropped or delayed to be transmitted in the next transmission occasion, that is, a transmission decision is made on the basis of comprehensive consideration of the priorities or importance and whether there is a waste of preparation and processing resources.

In addition to determining that the PUCCH carrying the first type of UCI overlaps with the PUSCH in the time domain after the target time node of the PUSCH, there is also a case in which it is determined that the PUCCH carrying the first type of UCI overlaps with the PUSCH in the time domain before the target time node of the PUSCH.

If it is determined that the PUCCH carrying the first type of UCI overlaps with the PUSCH in the time domain before the target time node of the PUSCH, the PUSCH is dropped and the first type of UCI is transmitted. Since it is determined that the PUCCH carrying the first type of UCI overlaps with the PUSCH in the time domain before the target time node of the PUSCH, the PUSCH is not yet ready to be transmitted or is not being transmitted at the instant at which the overlap is determined, so that dropping the PUSCH causes no waste of resources. Therefore, when it is determined that the PUCCH carrying the first type of UCI overlaps with the PUSCH in the time domain before the target time node of the PUSCH, the PUSCH may be dropped, and the first type of UCI is normally transmitted.

The following is examples for description.

Embodiment 1

Figure 3:
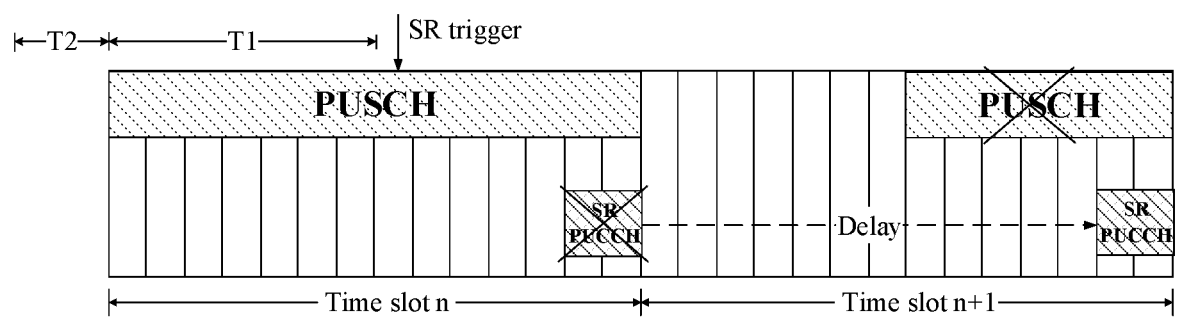
FIG. 3 is a schematic diagram of transmission with one SR transmission occasion in one time slot according to an embodiment of the present disclosure.

Assuming that a terminal is configured with a URLLC SR, the transmission period of the SR is once per time slot, and the transmission position is the last two symbols in each time slot; assuming that a PUSCH transmission overlaps with the time domain resource of the SR in the time slot n, and a PUSCH transmission overlaps with the time domain resource of the SR in the time slot n+1; and assuming that in the time slot n, the terminal determines that a positive SR needs to be transmitted (for example, receiving and parsing MAC signaling to trigger SR transmission) at the $8^{th}$ symbol, as shown in FIG. 3.

Since the PUCCH resources corresponding to the SR overlap with the PUSCH on the last two symbols of the PUSCH in the time slot n, and when the overlap is determined, the PUSCH has been started to be transmitted and has been transmitted in multiple symbols, the terminal perform the following methods.

Method 1: If the instant at which the overlap is determined is later than the start instant of the PUSCH, it is determined that the SR is not transmitted in the time slot n, only the PUSCH is transmitted, and the SR is delayed to an SR transmission occasion in the time slot n+1, thus avoiding the impact of the SR on the PUSCH being transmitted. It may be seen from FIG. 3 that in the time slot n+1, although the PUSCH also overlaps with the time domain resources of the SR, since the overlap may be determined before the start instant of the PUSCH, the PUSCH may not be transmitted from the start instant of the PUSCH in the time slot n+1 to avoid the overlap with the SR. In addition, since the overlap may be determined before the time duration T2 which is prior to the start instant of the PUSCH, the terminal does not perform any data preparation, such as encoding, rate matching and scrambling, for the PUSCH in the time slot n+1, thus saving processing resources and power consumption overhead.

Method 2: If the instant at which the overlap is determined is later than the time duration T1 which is after the start instant of the PUSCH, for example, as shown in FIG. 3, assuming that T1 is ½ the transmission length of the PUSCH, it is determined that the SR is not transmitted in the time slot n, only the PUSCH is transmitted, and the SR is delayed to an SR transmission occasion in the time slot n+1, thus avoiding the impact of the SR on the PUSCH being transmitted. In the time slot n+1, although the PUSCH also overlaps with the time domain resources of the SR, since the overlap may be determined before the start instant of the PUSCH, the PUSCH may not be transmitted from the start instant of the PUSCH in the time slot n+1 to avoid the overlap with the SR. In addition, since the overlap may be determined before the time duration T2 which is prior to the start instant of the PUSCH, the terminal does not perform any data preparation, such as encoding, rate matching and scrambling, for the PUSCH in the time slot n+1, thus saving processing resources and power consumption overhead.

Method 3: If the instant at which the overlap is determined is later than the time duration T2 which is prior to the transmission start instant of the PUSCH, for example, assuming that T2 is N2, and N2 is related to a subcarrier spacing and other parameters of the PUSCH, assuming that N2 is equal to four symbols, it is determined that the SR is not transmitted in the time slot n, only the PUSCH is transmitted, and the SR is delayed to an SR transmission occasion in the time slot n+1, thus avoiding the impact of the SR on the PUSCH being transmitted. In the time slot n+1, although the PUSCH also overlaps with the time domain resources of the SR, since the overlap may be determined before the transmission start instant of the PUSCH, In one embodiment before the time duration T2 which is prior to the transmission start instant of the PUSCH, the PUSCH may not be transmitted from the start instant of the PUSCH in the time slot n+1 to avoid the overlap with the SR. In addition, since the overlap may be determined before the time duration T2 which is prior to the start instant of the PUSCH, the terminal does not perform any data preparation, such as encoding, rate matching and scrambling, for the PUSCH in the time slot n+1, thus saving processing resources and power consumption overhead.

A base station: When the PUCCH resource corresponding to the SR overlaps with the PUSCH, the base station cannot determine whether the positive SR is transmitted on the PUCCH resource corresponding to the SR. In fact, only when the positive SR exists, the PUCCH may overlap with the PUSCH, and operations may be executed according to the overlap processing mode of the above-mentioned terminal, so the base station may only perform blind detection on the PUCCH corresponding to the SR and the PUSCH, that is, receiving on two channels respectively. For example, in the time slot n, if no information is detected out on the PUCCH resource corresponding to the SR, the SR is determined as a negative SR, that is, the SR does not overlap with the PUSCH, and only the PUSCH is received; and in the time slot n+1, if information is detected out on the PUCCH resource corresponding to the SR, it is considered that no PUSCH exists, and only the positive SR exists.

Embodiment 2

Figure 4:
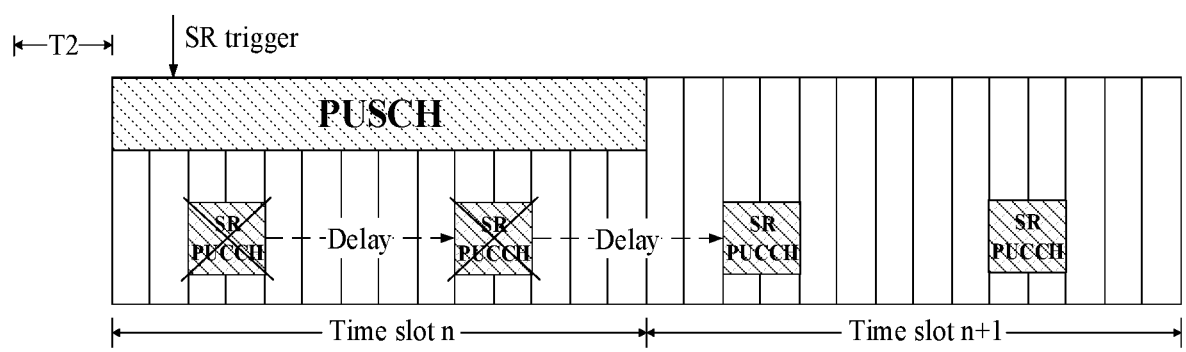
FIG. 4 is a schematic diagram of transmission with multiple SR transmission occasions in one time slot according to an embodiment of the present disclosure.

Assuming that the terminal is configured with a URLL SR, the transmission period of the SR is once per 7 symbols, and the transmission position is $3^{rd}$ and $4^{th}$ symbols and $10^{th}$ and $11^{th}$ symbols in a time slot. Assuming that a PUSCH transmission overlaps with the time domain resource of the SR in the time slot n, and a PUSCH transmission overlaps with the time domain resource of the SR in the time slot n+1. Assuming that in the time slot n, the terminal determines that a positive SR needs to be transmitted at the 2nd symbol, for example, receiving and parsing MAC signaling to trigger SR transmission, as shown in FIG. 4. Since the PUCCH resources corresponding to the SR overlap with the PUSCH on the $3^{rd}$ and $4^{th}$ symbols and the $10^{th}$ and $11^{th}$ symbols of the PUSCH in the time slot n, the terminal performs the following methods.

Method 1: If the instant at which the overlap is determined is later than the transmission start instant of the PUSCH, it is determined that the SR is not transmitted in transmission occasions in the time slot n, only the PUSCH is transmitted, and the SR is delayed to be transmitted in a first SR transmission occasion in the time slot n+1, thus avoiding the impact on the PUSCH being transmitted, as shown in FIG. 4.

Figure 5:
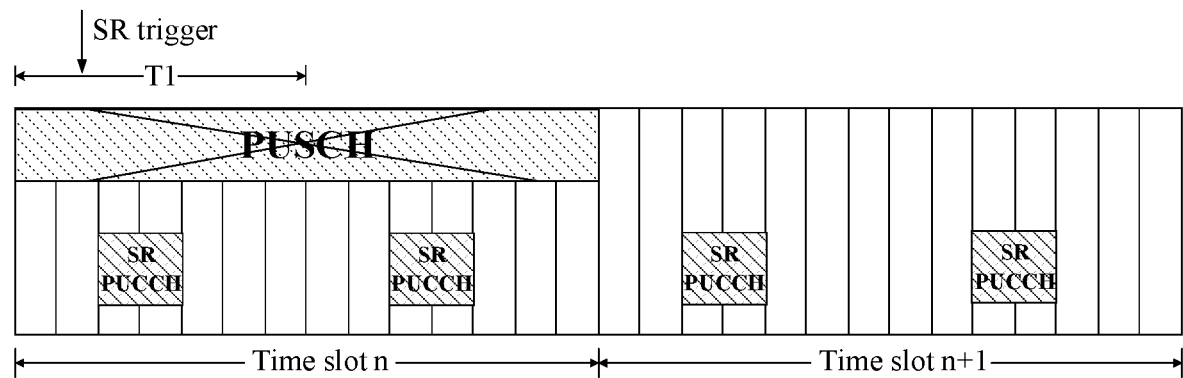
FIG. 5 is another schematic diagram of transmission with multiple SR transmission occasions in one time slot according to an embodiment of the present disclosure.

Method 2: If the instant at which the overlap is determined is earlier than the time duration T1 which is after the start instant of the PUSCH, for example, assuming that T1 is ½ of the transmission length of the PUSCH, it is determined that the PUSCH is dropped in the time slot n, that is, from a symbol overlapping with the SR. Because the PUSCH has only transmitted two symbols, that is, a first symbol and a second symbol, at the moment, the transmission waste caused is not very large, and the impact of dropping the PUSCH is not large, so the SR may be transmitted in the first SR transmission occasion to avoid excessive delay to the SR, as shown in FIG. 5.

Method 3: If the instant at which the overlap is determined is later than the time duration T2 which is prior to the transmission start instant of the PUSCH, for example, assuming that T2 is N2, a value of N2 is related to a subcarrier spacing and other parameters of the PUSCH, assuming that N2 is equal to 4 symbols, it is determined that the SR is not transmitted in SR transmission occasions in the time slot n, only the PUSCH is transmitted, and the SR is delayed to be transmitted in a first SR transmission occasion in the time slot n+1, thus avoiding the impact of the SR on the PUSCH being transmitted, as shown in FIG. 4.

A base station: When the PUCCH resources corresponding to the SR overlap with the PUSCH, the base station cannot determine whether the positive SR is transmitted on the PUCCH resources corresponding to the SR. In fact, only when the positive SR exists, the PUCCH may overlap with the PUSCH, and operations may be executed according to the overlap processing mode of the above-mentioned terminal, so the base station may only perform blind detection on the PUCCH corresponding to the SR and the PUSCH, that is, receiving on two channels respectively. For example, in the time slot n, if no information is detected out on the PUCCH resources corresponding to the SR, the SR is determined as a negative SR, that is, the SR does not overlap with the PUSCH, and only the PUSCH is received; and in the time slot n+1, if information is detected out on the PUCCH resources corresponding to the SR, it may be considered that no PUSCH exists, and only the positive SR exists.

It should be noted here that the above embodiment only takes the overlap of the URLLC SR PUCCH and the PUSCH as an example, and is also suitable for overlap of a PUCCH carrying other UCI or the PUSCH when the conditions are met. In principle, the method is not limited to the conditions specified in the present disclosure where the PUSCH is dropped, and may be applied when PUSCHs that are being transmitted need to be dropped due to any other reasons.

The above PUSCH may be a PUSCH of the eMBB, at the moment, the priority or importance of the URLLC SR is higher than the priority or importance of the eMBB. The above PUSCH may also be a URLLC PUSCH. Although the PUSCH belongs to the URLLC service with the SR, considering that if the PUSCH uses repeated transmission, the PUSCH occupies a long length in time domain, the delay of the SR will be too large if the SR is dropped. At the moment, because the SR overlaps with the repeatedly transmitted PUSCH, one or more of the repeatedly transmitted PUSCHs may be dropped. At the moment, if one PUSCH that is being transmitted is dropped, the above method may also be adopted.

In the foregoing, only that the SR and the PUSCH are on the same carrier and have the same subcarrier spacing as an example. When the SR and the PUSCH are on different carriers and/or have different subcarrier spacing, the lengths of time slots corresponding to the SR and the PUSCH may be different, but the above method is also suitable.

Based on the same inventive concept, an embodiment of the present disclosure also provides a transmission device. Since the device is a device in the transmission method provided by the embodiment of the present disclosure, and the principle of the device to solve problems is similar to that of the method, the implementation of the device may refer to the implementation of the method, which will not be repeated herein.

Figure 6:
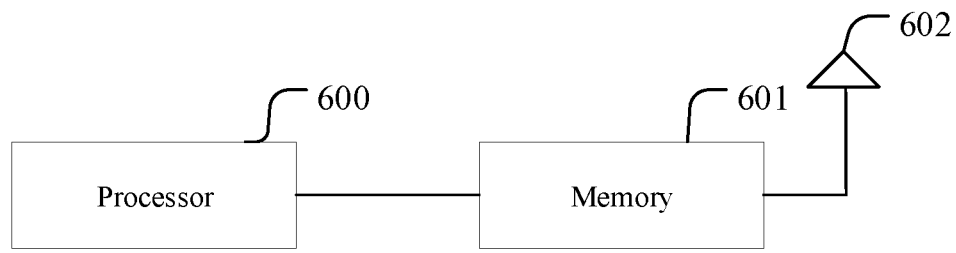
FIG. 6 is a schematic structural diagram of a first transmission device according to an embodiment of the present disclosure.

As shown in FIG. 6, the embodiment of the present disclosure provides a device for determining a radio access technology of a direct communication interface. The device includes a processor 600, a memory 601, and a transceiver 602.

The processor 600 is responsible for managing the bus architecture and general processing. The memory 601 may store data used by the processor 600 when performing operations. The transceiver 602 is used to receive and transmit data under the control of the processor 600.

The bus architecture may include any number of interconnected buses and bridges. In one embodiment, the buses and the bridges are linked together through various circuits of one or more processors represented by the processor 600 and memories represented by the memory 601. The bus architecture may also link various other circuits such as peripheral devices, voltage regulators and power management circuits, which are all known in the art, and therefore, no further description will be given herein. A bus interface provides an interface. The processor 600 is responsible for managing the bus architecture and general processing, and the memory 601 may store the data used by the processor 600 when performing operations.

A process disclosed in the embodiment of the present disclosure may be applied to the processor 600 or implemented by the processor 600. In the implementation process, each step of a signal processing process may be completed by an integrated logic circuit of hardware in the processor 600 or instructions in the form of software. The processor 600 may be a general-purpose processor, a digital signal processor, an application-specific integrated circuit, a field programmable gate array or other programmable logic devices, a discrete gate or transistor logic device, and a discrete hardware component, and may implement or execute the method, steps and logic block diagrams disclosed in the embodiment of the present disclosure. The general-purpose processor may be a microprocessor or any conventional processor or the like. The steps of the method disclosed in combination with the embodiment of the present disclosure may be directly embodied as executed and completed by a hardware processor, or executed and completed by a combination of hardware and software modules in the processor. The software module may be located in a mature storage medium in the field, such as random access memory, flash memory, read-only memory, programmable read-only memory, or electrically erasable programmable memory and registers. The storage medium is located in the memory 601, and the processor 600 reads information in the memory 601, and completes the steps of the signal processing process in combination with hardware of the processor 600.

In one embodiment, the processor 600 is used to read a program in the memory 601 to:
  in response to determining that a PUCCH carrying a first type of UCI overlaps with a PUSCH in a time domain after a target time node of the PUSCH,
  drop the first type of UCI or delay the first type of UCI to be transmitted in the next transmission occasion.

In some embodiments, the processor 600 is further configured to:
  in response to determining that the PUCCH carrying the first type of UCI overlaps with the PUSCH in the time domain before the target time node of the PUSCH,
  drop the PUSCH and transmit the first type of UCI.

In some embodiments, the processor 600 is further configured to determine the target time node in the following manners:
  a transmission start instant or symbol of the PUSCH, or
  an instant or symbol corresponding to a time duration T1 after a transmission start instant or symbol of the PUSCH, or
  a first symbol satisfying a time duration T1 after a transmission start instant or symbol of the PUSCH, or
  an instant or symbol corresponding to a time duration T2 before a transmission start instant or symbol of the PUSCH, or a first symbol satisfying a time duration T2 before a transmission start instant or symbol of the PUSCH.

In some embodiments, the time duration T1 or the time duration T2 is a predefined time length or a predefined symbol quantity, or the time duration T1 or the time duration T2 is a time length or a symbol quantity determined according to a predefined rule.

In some embodiments, the time duration T1 is 1/N of a transmission length of the PUSCH, and N is a positive integer greater than 1; and/or the time duration T2 is a preparation duration of the PUSCH.

In some embodiments, when the first type of UCI is delayed to be transmitted in the next transmission occasion, the processor 600 is further configured to:
  not transmit the first type of UCI in a transmission occasion overlapping with the PUSCH; and
  transmit the first type of UCI in an earliest transmission occasion after the transmission occasion overlapping with the PUSCH.

In some embodiments, in a condition that the first type of UCI is transmitted in the earliest transmission occasion after the transmission occasion overlapping with the PUSCH, the processor 600 is further configured to:
  drop the PUSCH overlapping with the PUCCH carrying the first type of UCI in response to that the PUSCH overlaps with the PUCCH carrying the first type of UCI in the earliest transmission occasion.

In some embodiments, in the condition that the PUSCH overlapping with the PUCCH carrying the first type of UCI is dropped, the processor 600 is further configured to:
  not prepare and transmit the PUSCH overlapping with the PUCCH carrying the first type of UCI; or
  start to not transmit the PUSCH overlapping with the PUCCH carrying the first type of UCI at a transmission start instant of the PUSCH overlapping with the PUCCH carrying the first type of UCI.

In some embodiments, the first type of UCI is one of the following information: an SR, UCI corresponding to a first type of service, or an SR corresponding to the first type of service; and/or, the PUSCH is a PUSCH corresponding to the first type of service or a second type of service.

In some embodiments, the first type of service includes:
  a service with a high priority or importance, or, a URLLC service; and
  the second type of service includes: a service with a low priority or importance, or an eMBB service, or, a non-URLLC service.

In some embodiments, the priorities or importance or service types are determined according to at least one of the following corresponding information: DCI formats; DCI sizes; RNTIs; search spaces; CORESETs; beams; BLERs; CQI tables; MCS tables; priority flags; PUCCH resources; or SR configuration serial numbers.

Based on the same inventive concept, an embodiment of the present disclosure further provides another transmission device. Since the device is a device in the transmission method provided in the embodiment of the present disclosure, and the principle of the device to solve problems is similar to that of the method, the implementation of the device may be referred to the implementation of the method, which will not be repeated herein.

Figure 7:
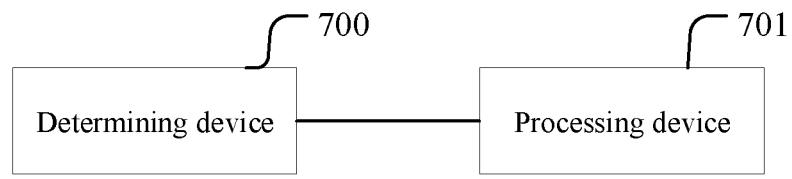
FIG. 7 is a schematic structural diagram of a second transmission device according to an embodiment of the present disclosure.

As shown in FIG. 7, a schematic structural diagram of the transmission device provided by the embodiment of the present disclosure, the transmission device includes: a determining device 700 and a processing device 701.

In response to that the determining device 700 determines that a PUCCH carrying a first type of UCI overlaps with a PUSCH in a time domain after a target time node of the PUSCH, the processing device 701 is used to drop the first type of UCI or delay the first type of UCI to be transmitted in a next transmission occasion.

In some embodiments, in response to that the determining device 700 determines that the PUCCH carrying the first type of UCI overlaps with the PUSCH in the time domain before the target time node of the PUSCH, the processing device 701 is further configured to drop the PUSCH and transmit the first type of UCI.

In some embodiments, the determining device 700 is further configured to determine the target time node in the following manners:
  a transmission start instant or symbol of the PUSCH, or
  an instant or symbol corresponding to a time duration T1 after a transmission start instant or symbol of the PUSCH, or
  a first symbol satisfying a time duration T1 after a transmission start instant or symbol of the PUSCH, or
  an instant or symbol corresponding to a time duration T2 before a transmission start instant or symbol of the PUSCH, or
  a first symbol satisfying a time duration T2 before a transmission start instant or symbol of the PUSCH.

In some embodiments, the time duration T1 or the time duration T2 is a predefined time length or a predefined symbol quantity, or the time duration T1 or the time duration T2 is a time length or a symbol quantity determined according to a predefined rule.

In some embodiments, the time duration T1 is 1/N of a transmission length of the PUSCH, and N is a positive integer greater than 1; and/or the time duration T2 is a preparation duration of the PUSCH.

In some embodiments, when the first type of UCI is delayed to be transmitted in the next transmission occasion, the processing device 701 is further configured to:
  not transmit the first type of UCI in a transmission occasion overlapping with the PUSCH; and
  transmit the first type of UCI in an earliest transmission occasion after the transmission occasion overlapping with the PUSCH.

In some embodiments, when the first type of UCI is transmitted in the earliest transmission occasion after the transmission occasion overlapping with the PUSCH, the processing device 701 is further configured to:
  drop the PUSCH overlapping with the PUCCH carrying the first type of UCI in response to that the PUSCH overlaps with the PUCCH carrying the first type of UCI in the earliest transmission occasion.

In some embodiments, in the condition that the PUSCH overlapping with the PUCCH carrying the first type of UCI is dropped, the processing device 701 is further configured to:
  not prepare and transmit the PUSCH overlapping with the PUCCH carrying the first type of UCI; or
  start to not transmit the PUSCH overlapping with the PUCCH carrying the first type of UCI at a transmission start instant of the PUSCH overlapping with the PUCCH carrying the first type of UCI.

In some embodiments, the first type of UCI is one of the following information: an SR, UCI corresponding to a first type of service, or an SR corresponding to the first type of service; and/or,
  the PUSCH is a PUSCH corresponding to the first type of service or a second type of service.

In some embodiments, the first type of service includes:
a service with a high priority or importance, or, a URLLC service; and
the second type of service includes: a service with a low priority or importance, or, an eMBB service, or, a non-URLLC service.

In some embodiments, the priorities or importance or service types are determined according to at least one of the following corresponding information: DCI formats; DCI sizes; RNTIs; search spaces; CORESETs; beams; BLERs; CQI tables; MCS tables; priority flags; PUCCH resources; or SR configuration serial numbers.

Figure 2:
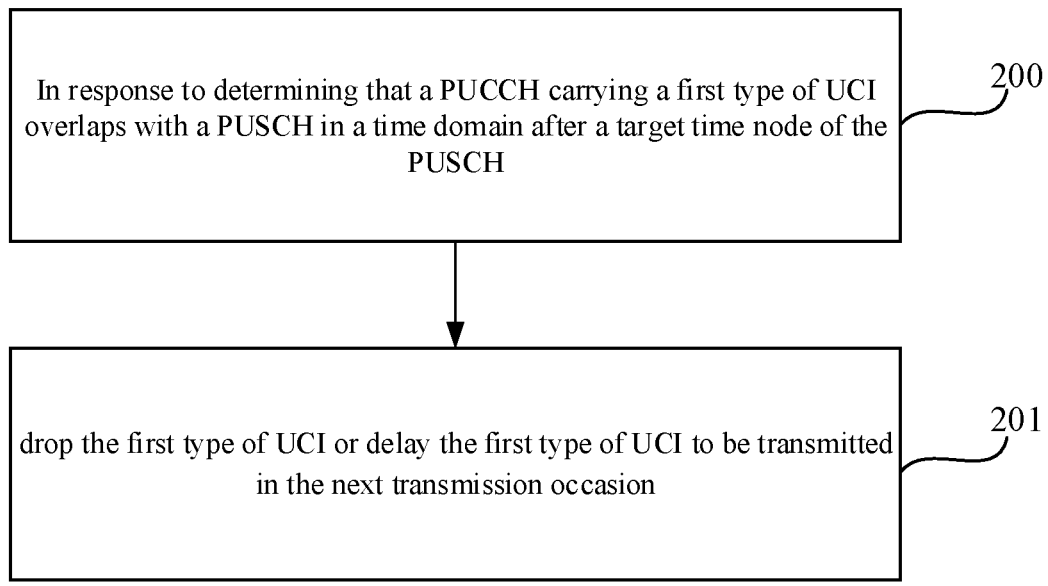
FIG. 2 is a schematic flowchart of a transmission method according to an embodiment of the present disclosure.

An embodiment of the present disclosure further provides a computer storable medium for transmission on which a computer program is stored. When the program is executed by a processor, the above steps of the method described in FIG. 2 are implemented.

The present application has been described above with reference to block diagrams and/or flow diagrams illustrating the method, the devices (systems) and/or the computer program product according to embodiments of the present application. It should be understood that one block of the block diagram and/or flowchart diagram and a combination of the blocks in the block diagram and/or flowchart diagram may be implemented by computer program instructions. These computer program instructions may be provided to a processor of a general-purpose computer or a special-purpose computer, and/or other programmable data processing devices to produce a machine, so that a method for implementing the functions/actions specified in the blocks of the block diagrams and/or flowcharts are created through the instructions executed via the computer processor and/or other programmable data processing device.

Correspondingly, hardware and/or software (including firmware, resident software, microcode, etc.) may also be used to implement the present application. Furthermore, the present application may take the form of a computer program product on a computer-usable or computer-readable storage medium, which has a computer-usable or computer-readable program code implemented in the medium for use by or in combination with an instruction execution system. In the context of the present application, the computer-usable or computer-readable medium may be any medium that may contain, store, communicate with, transmit, or transfer a program for use by or in combination with the instruction execution system, an apparatus, or a device.

What is claimed is:

1. A transmission method, performed by a terminal and comprising:
in response to determining that a physical uplink control channel (PUCCH) carrying a first type of uplink control information (UCI) overlaps with a physical uplink shared channel (PUSCH) in a time domain after a target time node associated with the PUSCH,
dropping the first type of UCI or delaying the first type of UCI to be transmitted in a next transmission occasion.

2. The method according to claim 1, further comprising:
in response to determining that the PUCCH carrying the first type of UCI overlaps with the PUSCH in the time domain before the target time node of the PUSCH,
dropping the PUSCH and transmitting the first type of UCI.

3. The method according to claim 1, wherein the target time node comprises:
a transmission start instant or symbol of the PUSCH, or
an instant or symbol corresponding to a time duration T1 after a transmission start instant or symbol of the PUSCH, or
a first symbol satisfying a time duration T1 after a transmission start instant or symbol of the PUSCH, or
an instant or symbol corresponding to a time duration T2 before a transmission start instant or symbol of the PUSCH, or
a first symbol satisfying a time duration T2 before a transmission start instant or symbol of the PUSCH.

4. The method according to claim 3, wherein the time duration T1 or the time duration T2 is a predefined time length or a predefined symbol quantity, or
the time duration T1 or the time duration T2 is a time length or a symbol quantity determined according to a predefined rule.

5. The method according to claim 4, wherein the time duration T1 is 1/N of a transmission length of the PUSCH, and N is a positive integer greater than 1; and/or
the time duration T2 is a preparation duration of the PUSCH.

6. The method according to claim 1, wherein delaying the first type of UCI to be transmitted in the next transmission occasion comprises:
not transmitting the first type of UCI in a transmission occasion overlapping with the PUSCH; and
transmitting the first type of UCI in an earliest transmission occasion after the transmission occasion overlapping with the PUSCH.

7. The method according to claim 6, wherein transmitting the first type of UCI in the earliest transmission occasion after the transmission occasion overlapping with the PUSCH comprises:
dropping the PUSCH overlapping with the PUCCH carrying the first type of UCI in response to that the PUSCH overlaps with the PUCCH carrying the first type of UCI in the earliest transmission occasion.

8. The method according to claim 7, wherein dropping the PUSCH overlapping with the PUCCH carrying the first type of UCI comprises:
not preparing and transmitting the PUSCH overlapping with the PUCCH carrying the first type of UCI; or
starting to not transmit the PUSCH overlapping with the PUCCH carrying the first type of UCI at a transmission start instant of the PUSCH overlapping with the PUCCH carrying the first type of UCI.

9. The method according to claim 1, wherein the first type of UCI is one of following information: a scheduling request (SR), UCI corresponding to a first type of service, or an SR corresponding to the first type of service; and/or,
the PUSCH is a PUSCH corresponding to the first type of service or a second type of service;
wherein:
the first type of service comprises: a service with a high priority or importance, or, an ultra reliability and low latency communication (URLLC) service; and
the second type of service comprises: a service with a low priority or importance, or an enhanced mobile broadband (eMBB) service, or, a non-URLLC service.

10. The method according to claim 9, wherein priorities or importance or service types are determined according to at least one of following corresponding information:
downlink control information (DCI) formats;
DCI sizes;

radio network temporary identities (RNTIs);
search spaces;
control resource sets (CORESETs);
beams;
block error ratios (BLERs);
channel quality indicator (CQI) tables;
modulation and coding scheme (MCS) tables;
priority flags;
PUCCH resources; or
SR configuration serial numbers.

11. A terminal, comprising: a processor, a memory and a transceiver,
wherein the processor is configured to read a program in the memory to:
in response to determining that a physical uplink control channel (PUCCH) carrying a first type of uplink control information (UCI) overlaps with a physical uplink shared channel (PUSCH) in a time domain after a target time node associated with the PUSCH,
drop the first type of UCI or delaying the first type of UCI to be transmitted in a next transmission occasion.

12. The terminal according to claim 11, wherein the processor is further configured to:
in response to determining that the PUCCH carrying the first type of UCI overlaps with the PUSCH in the time domain before the target time node of the PUSCH,
drop the PUSCH and transmit the first type of UCI.

13. The terminal according to claim 11, wherein the target time node comprises:
a transmission start instant or symbol of the PUSCH, or
an instant or symbol corresponding to a time duration T1 after a transmission start instant or symbol of the PUSCH, or
a first symbol satisfying the time duration T1 after a transmission start instant or symbol of the PUSCH, or
an instant or symbol corresponding to a time duration T2 before a transmission start instant or symbol of the PUSCH, or
a first symbol satisfying a time duration T2 before a transmission start instant or symbol of the PUSCH.

14. The terminal according to claim 13, wherein the time duration T1 or the time duration T2 is a predefined time length or a predefined symbol quantity, or
the time duration T1 or the time duration T2 is a time length or a symbol quantity determined according to a predefined rule.

15. The terminal according to claim 14, wherein the time duration T1 is 1/N of a transmission length of the PUSCH, and N is a positive integer greater than 1; and/or the time duration T2 is a preparation duration of the PUSCH.

16. The terminal according to claim 11, wherein when the first type of UCI is delayed to be transmitted in the next transmission occasion, the processor is further configured to:
not transmit the first type of UCI in a transmission occasion overlapping with the PUSCH; and
transmit the first type of UCI in an earliest transmission occasion after the transmission occasion overlapping with the PUSCH.

17. The terminal according to claim 16, wherein when the first type of UCI is transmitted in the earliest transmission occasion after the transmission occasion overlapping with the PUSCH, the processor is further configured to:
drop the PUSCH overlapping with the PUCCH carrying the first type of UCI in response to that the PUSCH overlaps with the PUCCH carrying the first type of UCI in the earliest transmission occasion.

18. The terminal according to claim 17, wherein in the condition that the PUSCH overlapping with the PUCCH carrying the first type of UCI is dropped, the processor is further configured to:
not prepare and transmit the PUSCH overlapping with the PUCCH carrying the first type of UCI; or
start to not transmit the PUSCH overlapping with the PUCCH carrying the first type of UCI at a transmission start instant of the PUSCH overlapping with the PUCCH carrying the first type of UCI.

19. The terminal according to claim 11, wherein the first type of UCI is one of following information: a scheduling request (SR), UCI corresponding to a first type of service, or an SR corresponding to the first type of service; and/or,
the PUSCH is a PUSCH corresponding to the first type of service or a second type of service;
wherein the first type of service comprises:
a service with a high priority or importance, or, an ultra reliability and low latency communication (URLLC) service; and
the second type of service comprises: a service with a low priority or importance, or an enhanced mobile broadband (eMBB) service, or, a non-URLLC service.

20. The terminal according to claim 19, wherein priorities or importance or service types are determined according to at least one of following corresponding information:
downlink control information (DCI) formats;
DCI sizes;
radio network temporary identities (RNTIs);
search spaces;
control resource sets (CORESETs);
beams;
block error ratios (BLERs);
channel quality indicator (CQI) tables;
modulation and coding scheme (MCS) tables;
priority flags;
PUCCH resources; or
SR configuration serial numbers.

* * * * *